(No Model.)
J. A. NEWMAN.
CARD FOR TEACHING DRAWING.
No. 282,659. Patented Aug. 7, 1883.
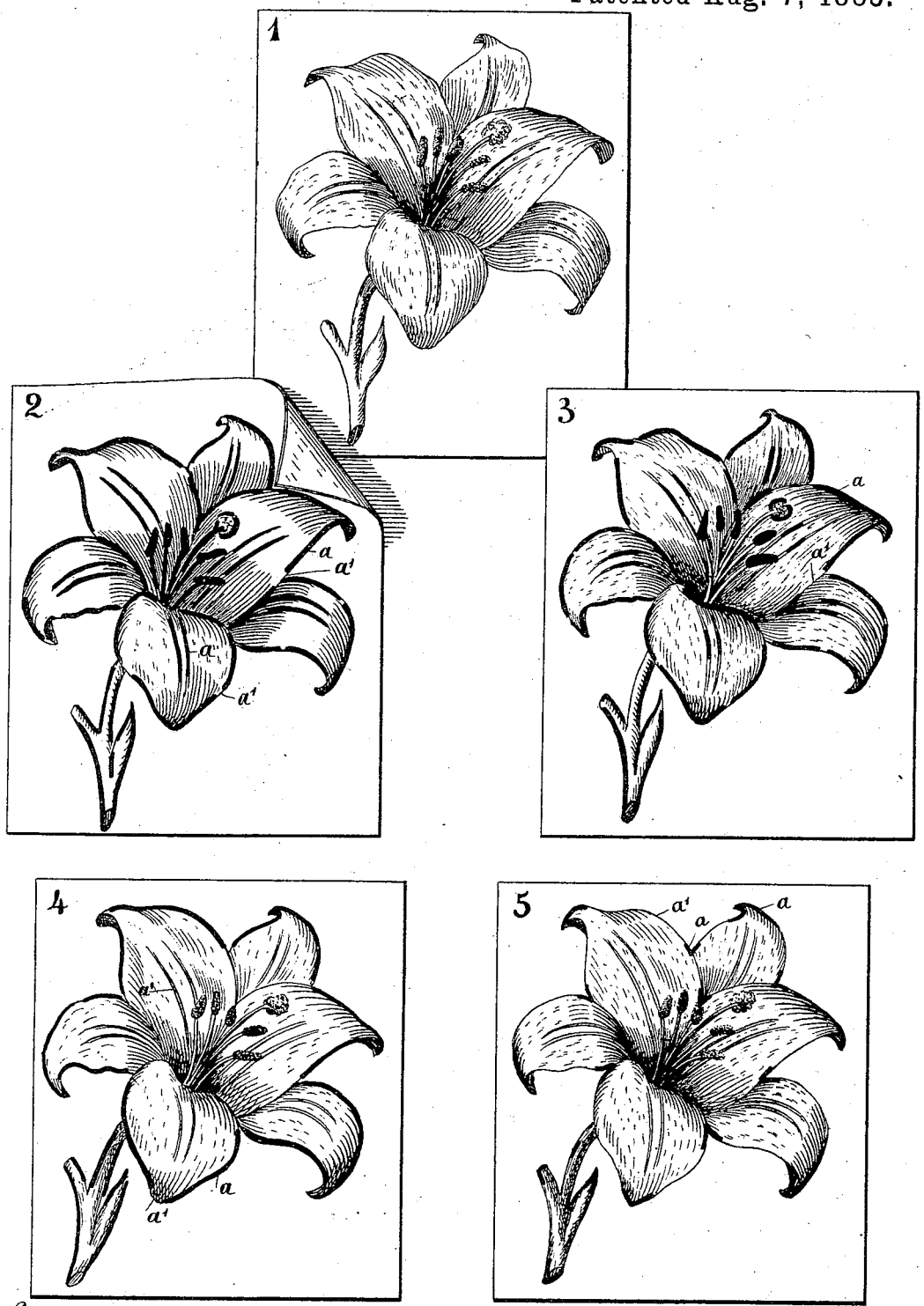
Witnesses:
J. Lorum.
L. Holmboe.
Inventor
John A. Newman
By Peirce & Fisher
Attorneys.

UNITED STATES PATENT OFFICE.

JOHN A. NEWMAN, OF CHICAGO, ILLINOIS.

CARD FOR TEACHING DRAWING.

SPECIFICATION forming part of Letters Patent No. 282,659, dated August 7, 1883.

Application filed June 18, 1883. (No model.)

*To all whom it may concern:*

Be it known that I, JOHN A. NEWMAN, a citizen of the United States, residing at Chicago, in the county of Cook and State of Illinois, have invented certain new and useful Improvements in Cards for Teaching the Art of Drawing, of which I do declare the following to be a full, clear, and exact description, reference being had to the accompanying drawing, forming part of this specification.

My present invention has for its object to provide a series of progressive cards for teaching the art of drawing, by which cards the pencil of the scholar, when beginning the study, may be guided in making nearly all the lines of the object to be drawn, and by which as his skill increases the aid derived from the cards shall become less and the pencil shall be guided only in making a very few lines or points. This object of invention I have accomplished by the series of cards hereinafter described, illustrated in the accompanying drawing, and particularly claimed at the end of this specification.

The card designated as No. 1 has printed thereon the perfect picture—as, for example, that of a flower—which the pupil is to copy. The remaining cards of the series have the same picture illustrated in part by the cut-away lines $a$ and in part by the surface-lines $a'$. The purpose of the cut-away lines is to form guides for the pencil of the pupil, by means of which he can trace to a greater or less extent the outlines of the object upon the drawing-paper or other surface beneath the cards.

In the card No. 2, as will be seen, nearly all the lines illustrating the object to be drawn are cut-away or guide lines, and with this card the pupil will begin the study, tracing with his pencil in the cut-away lines and filling in the few lines necessary to complete the picture, and this card will be repeatedly used until he has so far progressed as to take the next card (No. 3) of the series. In this and the remaining cards of the series, to which the pupil will successively proceed, the extent of the cut-away lines is gradually decreased, and that of the surface-lines is increased, so that less aid is given by guiding the pencil until the last card is reached, the cut-away lines of which serve only to indicate the merest outline points. In every case the cut-away lines should be first traced and the surface-lines should then be filled in to complete the picture, the surface-lines $a'$ on each card showing how this filling in is to be done.

The cards constituting the series may be of any desired number, and may be made of paper, card-board, thin metal, or other suitable material, and, if desired, may be bound in book form with other series of like cards. If desired, the card numbered 1 may be dispensed with, and the surface-lines may be omitted from some or all of the cards, although I prefer to arrange the cards in the manner shown.

It will be understood, of course, that the cards may be advantageously employed, not only in teaching the drawing of a great variety of objects, but as well also in teaching map-drawing and the like.

Having thus described the invention, what I claim as new, and desire to secure by Letters Patent, is—

1. A series of cards for teaching the art of drawing, said cards having cut-away guide-lines of different extent or number, substantially as described.

2. A series of cards for teaching the art of drawing, said cards having cut-away guide-lines and surface-lines, substantially as described.

In testimony whereof I have hereunto set my hand this 16th day of June, 1883.

JOHN A. NEWMAN.

In presence of—
JAMES H. PEIRCE,
GEO. P. FISHER, Jr.